US012761157B2

(12) United States Patent
Zhou et al.

(10) Patent No.: US 12,761,157 B2
(45) Date of Patent: Oct. 13, 2026

(54) PRODUCT INSPECTION SYSTEM, IMAGING SYSTEM AND MIRROR

(71) Applicants: Tyco Electronics (Shanghai) Co. Ltd, Shanghai (CN); TE Connectivity Services GmbH, Schaffhausen (CH)

(72) Inventors: Lei (Alex) Zhou, Shanghai (CN); Dandan (Emily) Zhang, Shanghai (CN); Roberto Francisco-Yi Lu, Bellevue, WA (US); Rong Zhang, Shanghai (CN); Qing (Carrie) Zhou, Shanghai (CN)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 889 days.

(21) Appl. No.: 17/829,535

(22) Filed: Jun. 1, 2022

(65) Prior Publication Data

US 2022/0390384 A1 Dec. 8, 2022

(30) Foreign Application Priority Data

Jun. 2, 2021 (CN) ......................... 202110614706.7

(51) Int. Cl.

| | |
|---|---|
| ***G01N 21/88*** | (2006.01) |
| ***G01N 21/17*** | (2006.01) |
| ***G01N 21/952*** | (2006.01) |
| ***G02B 5/10*** | (2006.01) |
| ***H04N 23/55*** | (2023.01) |

(52) U.S. Cl.
CPC ......... *G01N 21/8806* (2013.01); *G01N 21/17* (2013.01); *G01N 21/952* (2013.01); *G02B 5/10* (2013.01); *H04N 23/55* (2023.01); *G01N 2021/177* (2013.01); *G01N 2201/0636* (2013.01)

(58) Field of Classification Search
CPC .. G01N 21/952; G01N 21/8806; G01N 21/88; G01N 2021/8893; G06T 7/0004; G01B 11/30
See application file for complete search history.

(56) References Cited

U.S. PATENT DOCUMENTS 5,627,638 A * 5/1997 Vokhmin ........... G01M 11/0278 356/124
2002/0131632 A1 * 9/2002 Vernackt ............... G06T 7/0002 382/294
(Continued)

FOREIGN PATENT DOCUMENTS

JP 2004163426 A * 6/2004
JP 2008310783 A * 12/2008
(Continued)

*Primary Examiner* — Thomas K Pham
*Assistant Examiner* — Ruby L Kauffman
(74) *Attorney, Agent, or Firm* — Barley Snyder

(57) ABSTRACT

An imaging system includes a mirror and an imaging device. The mirror includes a body and a conical hole formed in the body. An inner wall surface of the conical hole is a conical mirror. The imaging device faces a first opening of the conical hole and captures an image of a product in the conical hole. A light from a side surface of the product is reflected by the conical mirror to the imaging device and the imaging device captures a side surface image of the product.

18 Claims, 5 Drawing Sheets

(56) References Cited

U.S. PATENT DOCUMENTS

2006/0176474 A1* 8/2006 Lehn .................... G01N 21/952
356/237.1
2008/0192471 A1* 8/2008 Sones .................. G01N 21/909
362/249.16

FOREIGN PATENT DOCUMENTS

KR 20030081579 A * 10/2003
TW 1745645 B * 11/2021 ............ G02B 7/182

* cited by examiner

PRODUCT INSPECTION SYSTEM, IMAGING SYSTEM AND MIRROR

CROSS-REFERENCE TO RELATED APPLICATION

This application claims the benefit of the filing date under 35 U.S.C. § 119(a)-(d) of Chinese Patent Application No. 202110614706.7, filed on Jun. 2, 2021.

FIELD OF THE INVENTION

The present invention relates to a mirror, an imaging system including the mirror, and a product inspection system including the imaging system.

BACKGROUND

In the prior art, when it is necessary to check whether the whole side surface of a product is defective, it is necessary to provide a plurality of cameras around the product to capture the image of the side surface of the product from a plurality of different angles. The existing scheme has high cost, and it is very difficult to splice multiple side surface images taken by the plurality of cameras from multiple different angles.

SUMMARY

An imaging system includes a mirror and an imaging device. The mirror includes a body and a conical hole formed in the body. An inner wall surface of the conical hole is a conical mirror. The imaging device faces a first opening of the conical hole and captures an image of a product in the conical hole. A light from a side surface of the product is reflected by the conical mirror to the imaging device and the imaging device captures a side surface image of the product.

BRIEF DESCRIPTION OF THE DRAWINGS

The invention will now be described by way of example with reference to the accompanying Figures, of which.

DETAILED DESCRIPTION OF THE EMBODIMENTS

Figure 1:
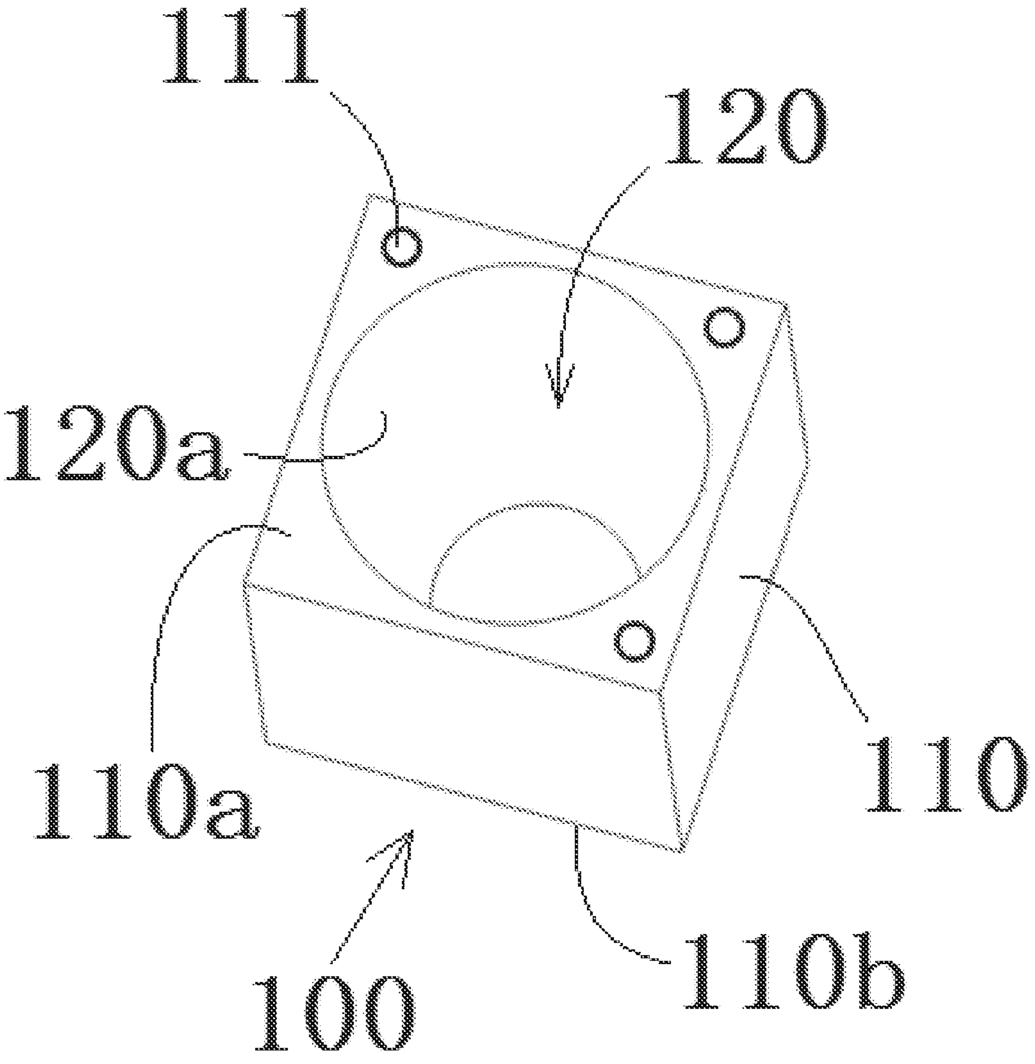
FIG. 1 is a perspective view of a mirror according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth to provide a thorough understanding of the disclosed embodiments. It will be apparent, however, that one or more embodiments may be practiced without these specific details. In other instances, well-known structures and devices are schematically shown to simplify the drawing.

Figure 4:
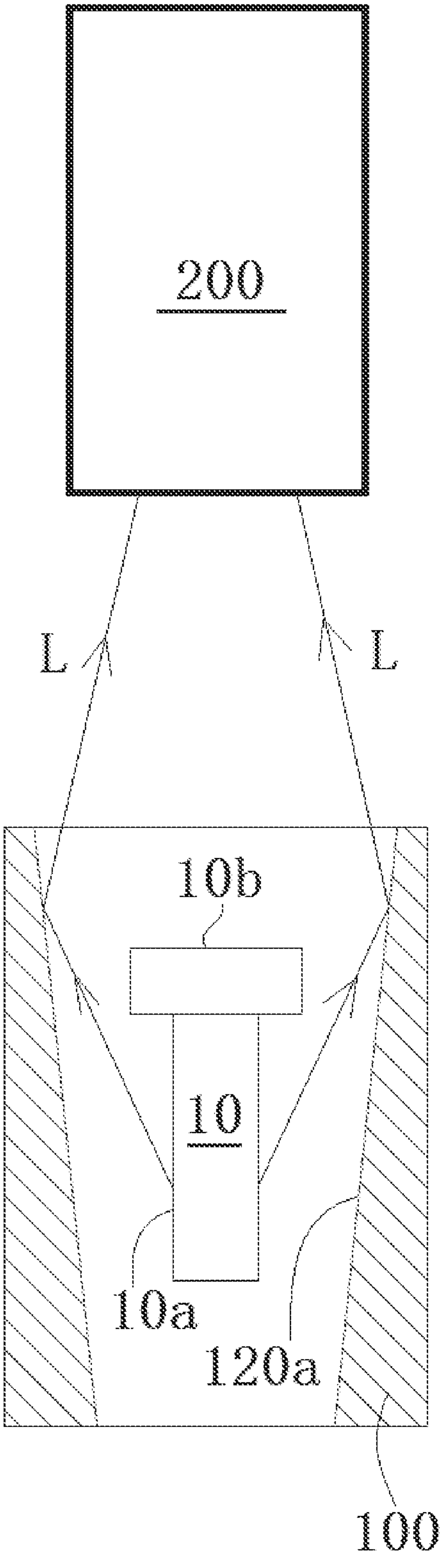
FIG. 4 is a schematic diagram of an imaging system according to an embodiment.

As shown in FIG. 4, the imaging system mainly includes a mirror 100 and an imaging device 200. The mirror 100, as shown in FIG. 1, includes a body 110 and a conical hole 120 formed in the body 110. The imaging device 200 is arranged to face an opening with a larger cross section of the conical hole 120 for capturing an image of a product 10, shown in FIGS. 2-5, placed in the conical hole 120.

Figure 2:
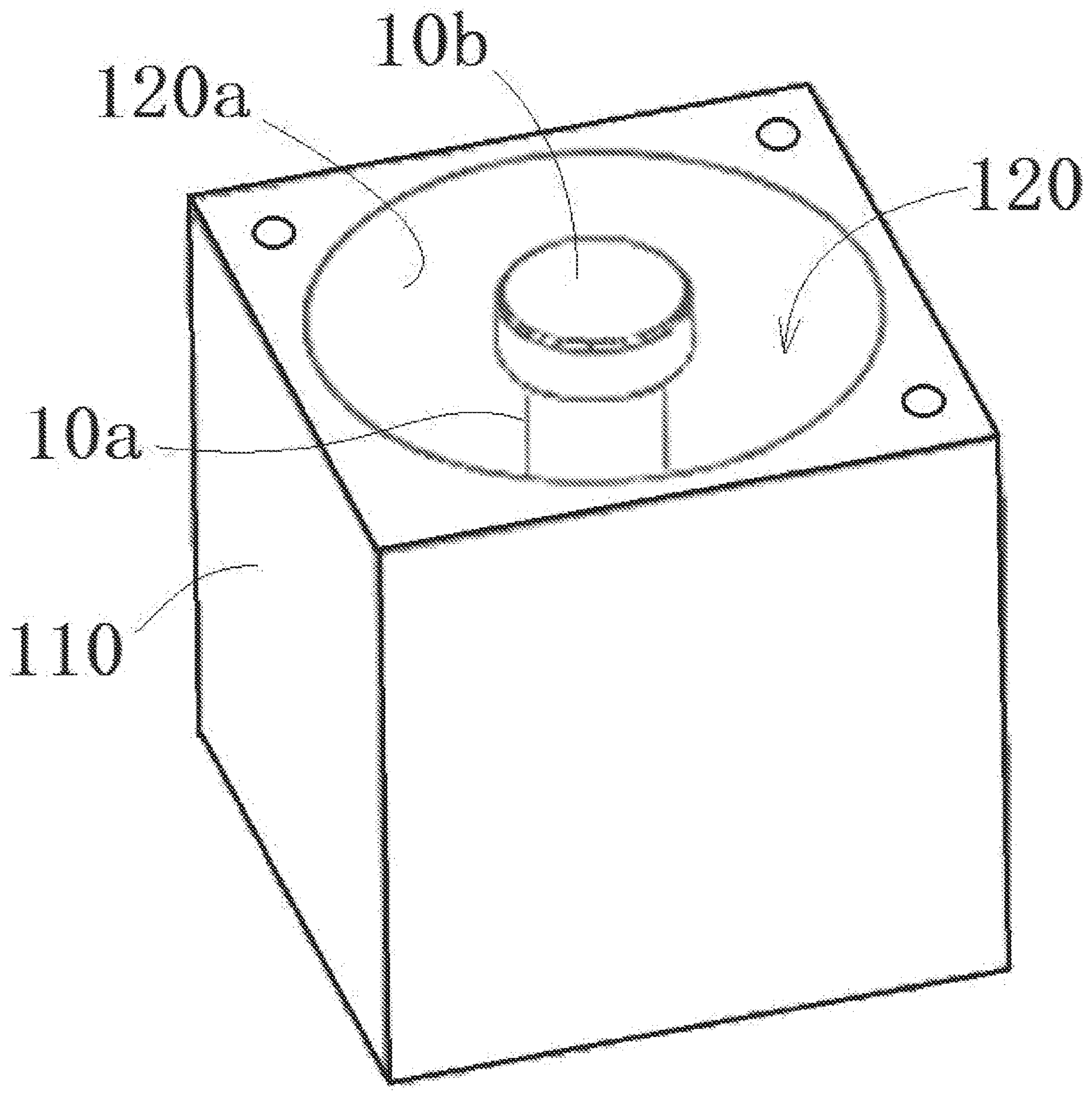
FIG. 2 is a perspective view of the mirror with a product in a hole of the mirror.
Figure 3:
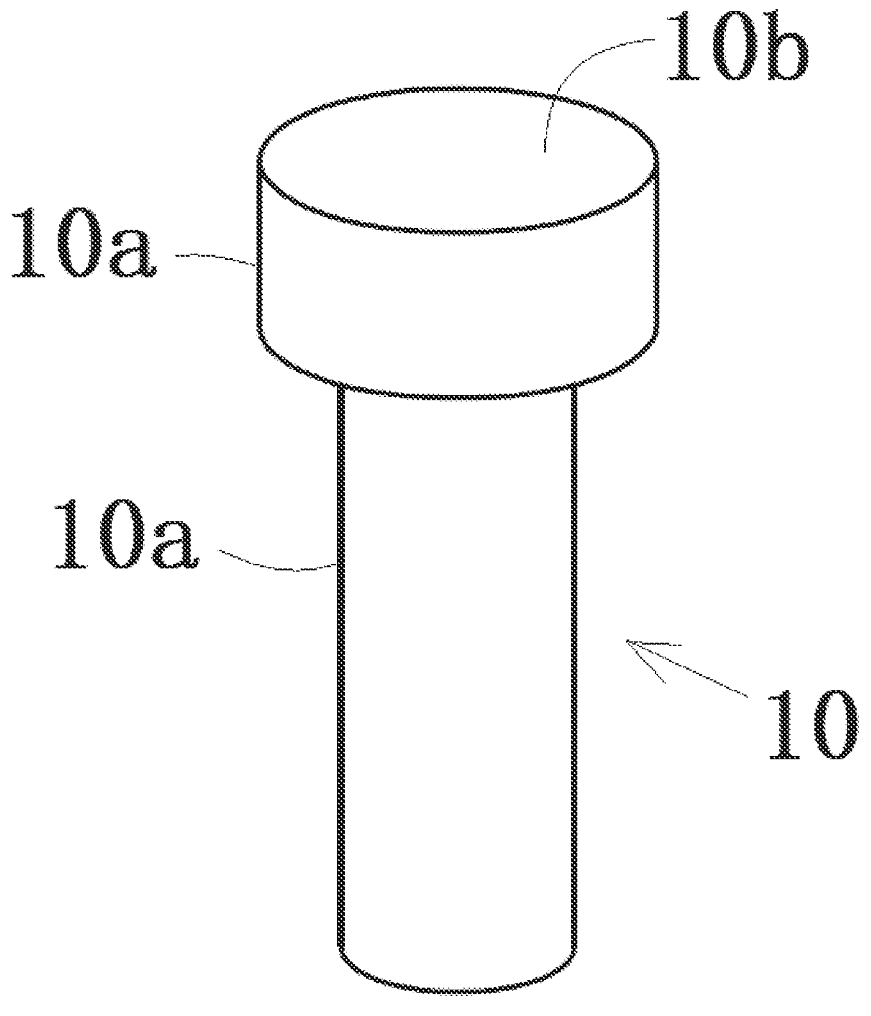
FIG. 3 is a perspective view of the product.

As shown in FIGS. 1, 2, and 4, the inner wall surface of the conical hole 120 is formed as a conical mirror 120*a*, so that the light L from the side surface 10*a* of the product 10 can be reflected to the imaging device 200 by the conical mirror 120*a*.

Figure 5:
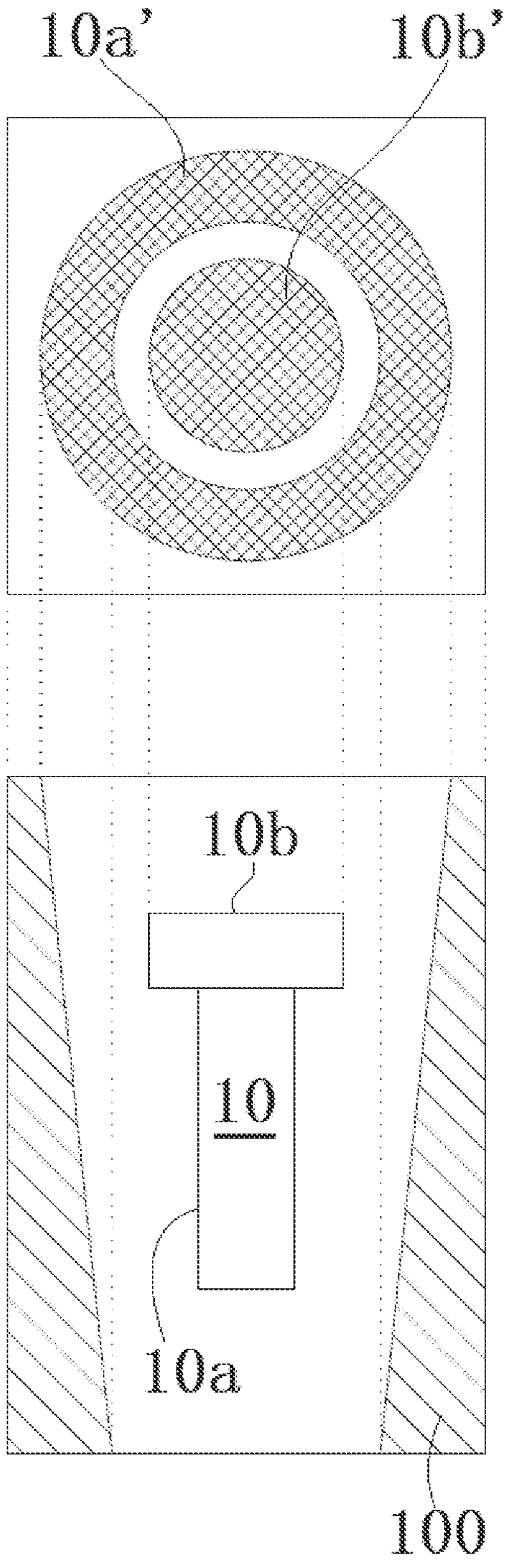
FIG. 5 is a schematic diagram of a side surface image and a top surface image of the product captured by the imaging system.

In this way, as shown in FIG. 5, the side surface image 10*a*' of the whole side surface 10*a* of the product 10 can be captured by the imaging device 200. Therefore, the present invention can use a single camera of imaging device 200 to capture the image of the whole side surface 10*a* of the product 10, which will reduce the cost of the imaging system, and the image processing is simple, because there is no need to splice multiple images taken from multiple different angles.

As shown in FIGS. 2 and 4, the product 10 placed in the conical hole 120 is oriented so that its top surface 10*b* faces the imaging device 200. In this way, the imaging device 200 can capture the side surface image 10*a*' and the top surface image 10*b*' of the product 10, shown in FIG. 5, at the same time.

The imaging device 200, as shown in FIG. 4, is arranged so that its optical axis coincides with the central axis of the conical hole 120. The product 10 placed in the conical hole 120 is cylindrical, and the central axis of the cylindrical product 10 is parallel or coincident with the central axis of the conical hole 120.

As shown in FIG. 1, the body 110 includes a first surface 110*a* and a second surface 110*b* opposite to the first surface 110*a*. The opening with a larger cross section of the conical hole 120 is formed on the first surface 110*a*, and an opening with a smaller cross section is formed on the second surface 110*b*.

As shown in FIG. 1, an identification mark 111 is formed on the first surface 110*a* of the body 110 to identify the opening with larger cross section of the conical hole 120, and it is ensured that the opening with larger cross section of the conical hole 120 faces the imaging device 200.

The conical hole 120 is designed to allow the product 10 to enter the conical hole 120 from the opening on the second surface 110*b* with a smaller cross section. In this way, the product 10 can be conveniently placed in the conical hole 120, as shown in FIGS. 2, 4, and 5, without interfering with or interfering with the imaging device 200 provided near the opening on the first surface 110*a* with a larger cross section.

An angle between the central axis of the conical mirror 120*a* and the central axis of the conical hole 120 is not less than 20 degrees and not more than 70 degrees. For example, in an exemplary embodiment of the present invention, the angle between the central axis of the conical mirror 120*a* and the central axis of the conical hole 120 may be equal to 30 degrees, 45 degrees or 60 degrees.

In the shown embodiment, the cross section of the conical hole 120 is circular, but the present invention is not limited to this. For example, the cross section of the conical hole 120 may be elliptical.

In an embodiment, the imaging system may also include a light source, which may be arranged at a position near the opening with a larger cross section of the conical hole 120 to provide illumination for the product 10.

The imaging device 200, shown in FIG. 4, may include a camera and an imaging lens arranged between the camera and the mirror 100. The conical mirror 120*a* first reflects the light L from the product 10 onto the imaging lens, uses the imaging lens to form an image of the product 10, and then uses the camera to capture the image formed by the imaging lens. In this way, an image of the product 10 can be captured.

In an embodiment, a product inspection system is also disclosed comprising the imaging system, an image processing device, and a quality inspection device. The image processing device is used to process the images 10*a*', 10*b*' of the product 10 captured by the imaging system shown in FIG. 5. The quality inspection device is used to detect whether the outer surface of the product 10 has defects according to the processed images 10*a*', 10*b*'. For example, whether the surface size of product 10 meets the requirements, or whether there are cracks on the surface of the product 10.

In an embodiment, a mirror is also disclosed. The mirror comprises a body 110 and a conical hole 120 formed in the body 110, as shown in FIG. 1. The inner wall surface of the conical hole 120 is formed as a conical mirror 120*a* for reflecting the light L from the side surface 10*a* of the product 10 to the imaging device 200, as shown in FIG. 4, so that the side surface image 10*a*' of the product 10 can be captured by the imaging device 200.

As shown in FIG. 5, the imaging device 200 can capture the image 10*a*' of the whole side surface 10*a* of the product 10 at one time. However, if the length of the product 10 is too large and the conical hole 120 cannot receive the whole product 10, it is difficult for the imaging device 200 to capture the image of the whole side surface 10*a* of the product 10 at one time. In this case, the product 10 can be moved to multiple shooting positions along the axial direction of the conical hole 120, and the image of the product 10 when it is moved to each shooting position can be captured by the imaging device 200, In this way, the whole side surface 10*a* of the product 10 can be covered by a plurality of captured images.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An imaging system, comprising:

a mirror including a body and a conical hole formed in the body, an inner wall surface of the conical hole is a conical mirror, the body having a first surface and a second surface opposite the first surface, the conical hole extending between the first surface and the second surface, an angle between a central axis of the conical mirror and a central axis of the conical hole is greater than or equal to 20 degrees and less than or equal to 30 degrees; and an imaging device facing a first opening of the conical hole and capturing an image of a product held stationary within the conical hole during imaging, a light from a side surface of the product is reflected by the conical mirror to the imaging device and the imaging device captures a side surface image of the product, the entire product is arranged between the first surface and the second surface within the conical hole such that there is a first gap between a top surface of the product and the first surface and a second gap between a bottom surface of the product and the second surface.

2. The imaging system of claim 1, wherein the top surface of the product in the conical hole faces the imaging device.

3. The imaging system of claim 2, wherein the imaging device captures the side surface image and a top surface image of the product at the same time.

4. The imaging system of claim 1, wherein an optical axis of the imaging device coincides with a central axis of the conical hole.

5. The imaging system of claim 1, wherein the product is cylindrical and a central axis of the product is parallel or coincident with a central axis of the conical hole.

6. The imaging system of claim 1, wherein the first opening is formed on the first surface and a second opening is formed on the second surface, the first opening has a larger cross-section than the second opening.

7. The imaging system of claim 6, wherein the first surface of the body has an identification mark identifying the first opening.

8. The imaging system of claim 6, wherein the product enters the conical hole from the second opening.

9. The imaging system of claim 1, wherein the conical hole has a circular or elliptical cross-section.

10. The imaging system of claim 1, further comprising a light source facing the first opening and providing an illumination for the product.

11. The imaging system of claim 1, wherein the imaging device includes a camera and an imaging lens between the camera and the mirror.

12. A product inspection system, comprising:

an imaging system including a mirror and an imaging device, the mirror including a body and a conical hole formed in the body, an inner wall surface of the conical hole is a conical mirror, the imaging device faces a first opening of the conical hole and captures an image of a product held stationary within the conical hole during imaging, a light from a side surface of the product is reflected by the conical mirror to the imaging device and the imaging device captures an image of the entire product at one time while the product is in the conical hole, an angle between a central axis of the conical mirror and a central axis of the conical hole is greater than 50 degrees and less than or equal to 60 degrees.

13. The product inspection system of claim 12, further comprising an image processing device processing a plurality of images of the product captured by the imaging system.

14. The product inspection system of claim 13, further comprising a quality inspection device detecting whether an outer surface of the product has defects according to the images processed by the image processing device.

15. The imaging system of claim 1, wherein the product is arranged entirely within the conical hole of the body.

16. The imaging system of claim 1, wherein the imaging device captures an image of an entire side of the product facing the inner wall surface of the conical hole.

17. An imaging system, comprising:

a mirror including a body and a conical hole formed in the body, an inner wall surface of the conical hole is a conical mirror, the body having a first surface and a second surface opposite the first surface, the conical hole extending between the first surface and the second surface, an angle between a central axis of the conical mirror and a central axis of the conical hole is greater than or equal to 20 degrees and less than or equal to 30 degrees;

a product positioned entirely within and stationary in the conical hole; and an imaging device facing a first opening of the conical hole and capturing an image of the product in the conical hole, a light from side surfaces of the product is reflected by the conical mirror to the imaging device and the imaging device captures an image of an entire side of the product facing the inner wall surface of the conical hole, the entire product is arranged between the first surface and the second surface within the conical hole such that there is a first gap between a top surface of the product and the first surface and a second gap between a bottom surface of the product and the second surface.

18. The product inspection system of claim 12, wherein the product is arranged entirely within the conical hole of the body.

* * * * *